United States Patent
Wang et al.

(10) Patent No.: US 9,269,949 B2
(45) Date of Patent: Feb. 23, 2016

(54) SYNTHESIS OF MICRO-SIZED INTERCONNECTED SI-C COMPOSITES

(71) Applicants: Donghai Wang, State College, PA (US); Ran Yi, State College, PA (US); Fang Dai, State College, PA (US)

(72) Inventors: Donghai Wang, State College, PA (US); Ran Yi, State College, PA (US); Fang Dai, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 66 days.

(21) Appl. No.: 14/054,219

(22) Filed: Oct. 15, 2013

(65) Prior Publication Data

US 2014/0106219 A1    Apr. 17, 2014

Related U.S. Application Data

(60) Provisional application No. 61/713,324, filed on Oct. 12, 2012.

(51) Int. Cl.

| | |
|---|---|
| *H01M 4/134* | (2010.01) |
| *H01M 4/04* | (2006.01) |
| *H01M 4/38* | (2006.01) |
| *H01M 4/62* | (2006.01) |
| *H01M 4/1395* | (2010.01) |

(52) U.S. Cl.
CPC ............ *H01M 4/134* (2013.01); *H01M 4/0471* (2013.01); *H01M 4/386* (2013.01); *H01M 4/625* (2013.01); *H01M 4/1395* (2013.01); *Y02E 60/122* (2013.01)

(58) Field of Classification Search
CPC ............ H01M 4/62; B82Y 5/00; C30B 29/06; C30B 29/36
USPC ........................................................ 429/218.1
See application file for complete search history.

(56) References Cited

U.S. PATENT DOCUMENTS

| | | | | |
|---|---|---|---|---|
| 3,852,086 | A | * | 12/1974 | Murata et al. ................... 148/22 |
| 5,354,696 | A | | 10/1994 | Oostra et al. |
| 5,510,212 | A | | 4/1996 | Delnick et al. |
| 7,785,661 | B2 | | 8/2010 | Carel et al. |
| 8,029,931 | B2 | | 10/2011 | Im et al. |

(Continued)

FOREIGN PATENT DOCUMENTS

RU        2179526 C2    2/2002

OTHER PUBLICATIONS

Pushpendra Kumar, Peter Lemmens, Manash Ghosh, Frank Ludwig, and Meinhard Schilling. Effect of HF concentration on physical and electronic properties of electrochemically formed nanoporous silicon. 2009. J. Nanomaterials 2009, Article 18 (Jan. 2009), 7 pages. DOI=10.1155/2009/728957    http://dx.doi.org/10.1155/2009/728957.*

(Continued)

*Primary Examiner* — Nicholas P D'Aniello
(74) *Attorney, Agent, or Firm* — Buchanan Ingersoll & Rooney PC

(57) ABSTRACT

Embodiments provide a method of producing micro-sized Si—C composites or doped Si—C and Si alloy-C with interconnected nanoscle Si and C building blocks through converting commercially available $SiO_x$ (0<x<2) to a silicon framework by calcination, followed by etching and then by carbon filling by thermal deposition of gas containing organic molecules that have carbon atoms.

15 Claims, 21 Drawing Sheets

Scheme. The synthesis process from SiO precursors to Si-C composites

(56) References Cited

U.S. PATENT DOCUMENTS

| | | | |
|---|---|---|---|
| 8,062,556 | B2 | 11/2011 | Peres et al. |
| 8,864,045 | B1* | 10/2014 | Jiang et al. ............... 239/13 |
| 2004/0126659 | A1 | 7/2004 | Graetz et al. |
| 2005/0136330 | A1 | 6/2005 | Mao et al. |
| 2007/0077490 | A1 | 4/2007 | Kim et al. |
| 2008/0261116 | A1 | 10/2008 | Burton et al. |
| 2009/0029256 | A1 | 1/2009 | Mah et al. |
| 2009/0053608 | A1 | 2/2009 | Choi et al. |
| 2009/0068553 | A1 | 3/2009 | Firsich |
| 2009/0181212 | A1 | 7/2009 | Zenasni |
| 2010/0092868 | A1 | 4/2010 | Kim et al. |
| 2010/0330423 | A1* | 12/2010 | Cui et al. ............... 429/220 |
| 2011/0097627 | A1* | 4/2011 | Watanabe et al. ........ 429/206 |
| 2011/0311874 | A1 | 12/2011 | Zhou et al. |
| 2012/0241192 | A1* | 9/2012 | Cai et al. ............... 174/126.2 |
| 2013/0045420 | A1* | 2/2013 | Biswal et al. ............ 429/217 |

OTHER PUBLICATIONS

Wang, Hao et al., Fabrication of Porous SiC Ceramics with Special Morphologies by Sacrificing Template Method, Journal of Porous Materials 11: 265-271, 2004.

Starkov V. V. et al. Nanovoloknisty uglerod v. gradientno-poristoi strukture kremniya. Pisma v. ZHTF, 2006, tom 32, vup. 2.

Zolotov A.V. Modelirovanic protessov termicheskogo otzhiga i vysokotemperaturnoi karbonizatisii poristogo kremniya. Avtoreferat dissertatsii na soiskanie uchenoi stepeni. Uliyanovsk, 2007.

International Search Report and Written Opinion for PCT/US2013/065039, Feb. 13, 2014.

Lee et al. "Highly Stable Si-based Multicomponent Anodes for Practical Use in Lithium-ion Batteries", Energy & Environmental Science, The Royal Society of Chemistry 2012.

Bang, et al. "High-Performance Macroporous Bulk Silicon Anodes Synthesized by Template-Free Chemical Etching", Adv. Energy Mater, 2012.

Bang et al. "Scalable Approach to Multi-Dimensional Bulk Si Anodes via Metal-Assisted Chemical Etching" Energy & Environmental Science, The Royal Society of Chemistry 2011.

Lee et al. "Chemical-Assisted Thermal Disproportionation of Porous Silicon Monoxide into Silicon-Based Multicomponent Systems" Angew. Chem, Int. Ed. 2012.

* cited by examiner

Scheme. The synthesis process from SiO precursors to Si-C composites

SYNTHESIS OF MICRO-SIZED INTERCONNECTED SI-C COMPOSITES

CROSS-REFERENCE TO RELATED APPLICATIONS

This application claims priority to U.S. Provisional Patent Application No. 61/713,324, filed on Oct. 12, 2012. That application is incorporated by reference herein.

STATEMENT REGARDING FEDERALLY SPONSORED RESEARCH OR DEVELOPMENT

This invention was made with government support under Grant No. DE-AC02-05CH11231, awarded by the Department of Energy. The Government has certain rights in the invention.

BACKGROUND OF THE INVENTION

The emerging markets of electric vehicles (EV) and plug-in hybrid electric vehicles (PHEV) generate a tremendous demand for low-cost lithium-ion batteries (LIBs) with high energy and power densities, and long cycling life. Anode materials in commercial LIBs are primarily synthetic graphite-based materials with a capacity of ~370 mAh/g. Improvements in anode performance, particularly in anode capacity, are desirable to achieving higher energy densities in LIBs for the EV and PHEV applications.

Silicon has been pursued as a promising anode material for high-energy-density LIBs because of its high specific capacity (>3500 mAh/g) and abundance. Despite its high capacity, silicon ("Si") suffers from the fast capacity fading caused by large volume change (>300%) and the resultant loss of electric contact and disintegration (cracking and crumbling) of the anode structure during lithiation and delithiation.

The development of silicon-carbon ("Si—C") nanocomposites, composed of -silicon nanostructures (e.g., nanowires, nanotubes, nanoparticles) intimately contacted with carbon, has been widely studied. These nanocomposites proved as an effective solution to improve capacity cycling stability as nano-sized silicon can alleviate physical strains and mechanical fracture generated during volume changes to prevent the fast disintegration. Intimated contact between silicon and carbon can maintain anode structure integration.

The use of nano-sized silicon materials presents difficulties in practical application as electrode materials for LIBs. First, nano-sized materials may pose health risks to humans and harmful effects to the environment. They may have other safety issues, which may hamper their application to a great extent. Second, a high tap density is an important factor, especially for fabrication of high-energy LIBs for EVs and HEVs because it offers low reactivity and a high volumetric energy density. Unfortunately, tap density of nano-sized materials is generally low, which in turn holds down their specific volumetric capacity. Furthermore, preparation for the nano-sized silicon either requires chemical/physical vapor deposition or involves complicated processes, which has drawbacks of high cost and low yield, and is difficult to scale up. To date, the advantage of abundance of silicon has not been fully embodied due to lack of low-cost strategy for large-scale synthesis of silicon anode materials with superior performance.

Micro-sized materials are favorable for practical battery application since they assure higher tap density than nano-sized materials and, as a result, are expected to offer higher volumetric capacity. However, the limitations of micro-sized silicon materials are clear. The solid micro-sized silicon materials are more likely to undergo mechanical disintegration upon volume change during lithiation and delithiation compared with nano-sized materials, resulting in severe capacity fading. The micro-sized materials also have long ion and electron transportation paths, which adversely affect high rate capability. From this point of view, it is desirable to develop new materials that combine the advantages of both micro-sized and nano-sized silicon materials to improve cycling performance and energy density of silicon anodes.

Two models of micro-sized silicon anode materials with nanostructured building blocks have been proposed. One model is a porous silicon material in which the volume change of the silicon can be accommodated by pores to improve cycling stability. Cho et. al. report a porous silicon composed of a nanocrystalline silicon framework created by a templated approach converting silicon gel to porous silicon. The porous silicon shows a superior performance with high capacity and good cycling stability. The synthesis involves complicated synthesis of silicon gel obtained from reduction of $SiCl_4$. This leads to low yield and high cost of the silicon anode.

A low cost approach to produce porous micro-sized silicon has been reported by catalytically etching surface layers of micro-sized bulk silicon, and the obtained porous micro-sized silicon powder shows good cycling stability within only limited cycles (not more than 70 cycles). Another example is micro-sized C—Si nanocomposite spherical granules prepared by physically depositing silicon nanoparticles into porous micro-sized carbon granules, which exhibited a good capacity retention of about 1500 mAh/g after 100 cycles at 1 C, a tap density of 0.49 $g/cm^3$ and a volumetric capacity of approximately 1270 $mAh/cm^3$ at C/20. Solid micro-sized composites consisting of interwoven nano-components is the other model that successfully shows superior cycling performance and high energy density. The volume change of active materials is buffered by the surrounding integrated components. For example, carbon-coated micro-sized silicon-based multicomponent anodes consisting of Si/SiO cores and crystalline $SiO_2$ shells show a high reversible capacity of 1280 mAh/g after 200 cycles and a volumetric energy density of 1160 $mAh/cm^3$.

In spite of microscale sizes as a whole, such micro-sized Si—C nanocomposite materials not only fully utilize the advantages of their nano-sized silicon building blocks but also integrate them to micro-size bulk form to reach a high volumetric energy density. However, reports on synthesis of micro-sized Si—C nanocomposite anode with good cycling performances are still limited.

BRIEF SUMMARY OF THE INVENTION

Here, we report a low-cost gram-scale synthesis approach to produce bulk micro-sized Si—C composites in which silicon and C components are three-dimensionally interwoven and contacted at nanoscale level showing excellent electrochemical performance. In one embodiment the bulk Si—C nanocomposites exhibit 97.8% capacity retention after 200 cycles at 1 A/g and good high rate performance. They also have a significantly high tap density of 0.78 $g/cm^3$. In a further embodiment heteroatomic doping (such as boron and phosphorus) and alloy formation can also be performed to obtain corresponding doped and alloy materials. The excellent performance of bulk Si—C nanocomposites as well as their low-cost and large-scale synthesis makes them a promising anode material for practical application in LIBs.

DETAILED DESCRIPTION OF THE INVENTION

Figure 1:
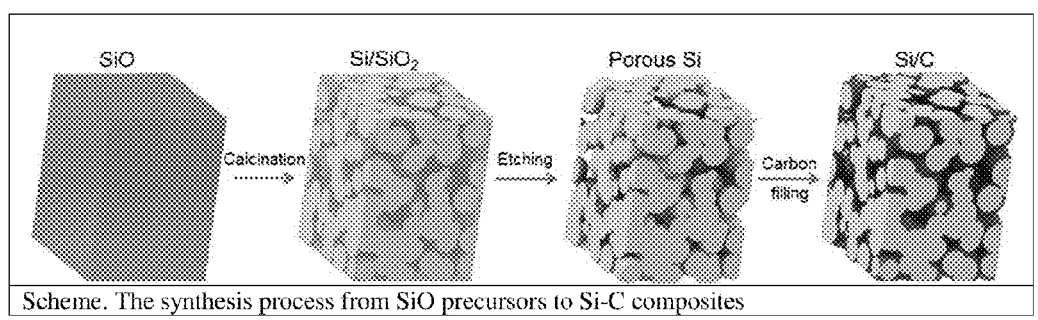
FIG. 1 is a schematic representation of a synthesis process according to the claimed method.

A synthesis of Si—C nanocomposites includes formation of micro-sized porous silicon composed of nanocrystalline interconnected silicon frameworks, followed by depositing and filling carbon into the porous structures, to obtain the micro-sized Si—C nanocomposites. A synthesis process is schematically summarized in the Scheme of FIG. 1. In one embodiment the porous micro-sized silicon is first prepared by employing SiO as silicon source through a *facile* calcination and etching route. In a typical embodiment the SiO is commercially available. NaOH and acetic acid are not used during typical embodiments of these processes.

During calcination, nanocrystalline silicon and amorphous $SiO_2$ are formed due to the disproportion of SiO. The porous silicon framework composed of interconnected silicon nanoparticles is obtained after $SiO_2$ is removed by an etching process. After carbon filling by thermal deposition of acetylene, the pores in the porous silicon framework are then occupied by carbon to form Si—C nanocomposites with silicon and carbon three-dimensionally interwoven at nanoscale. Carbon acts as not only as buffer layers but also as conductivity enhancers of the porous bulk silicon framework.

With the broad framework of the invention having been described, we now explore the various aspects and embodiments in more detail. A typical starting material is silicon oxide (SiO), Other starting materials may be expressed as $SiO_x$, where x is between 0 and 2.

The silicon precursor is calcined. Calcination may take place, for example, between 900-1150° C., between 900-1100° C., between 950-1050° C., or at about 1000° C. The time of calcination may vary. In some embodiments it is between 2-24 hours, between 5-20 hours, or between 10-15 hours. In other embodiments calcination time between 2-5 hours, 5-10 hours, or 15-20 hours. Calcination may occur under an inert atmosphere. For example, it may occur under a nitrogen or argon atmosphere.

Following calcination, silica is removed by etching. This is typically done by treatment of the calcined silica with hydrofluoric acid. The hydrofluoric acid may have a molarity, for example, between 40% and 50%.

Following removal of the silica, the voids left by etching are then filled with carbon. This is done, for example, by placing the calcined, etched silicon in an atmosphere of acetylene. The acetylene is then thermally decomposed. Alternatives to acetylene include other gases that contain organic molecules that have carbon atoms. Suitable gases may be, for example, a gas or mixture of gases selected from hydrocarbons such as methane, ethane, propane, butane, pentane, hexane, ethylene, propylene, butylene, and acetylene. Hydrocarbon gases and mixtures of hydrocarbon gasses having higher numbers of carbon in their structures may also be used.

The mixture is heated to between 500-900° C., between 600-700° C., or between 600-650° C. In one embodiment it is heated to about 620° C. Analysis of the carbon, which fills the voids left by the etching, shows that the carbon is typically amorphous and its distribution is typically uniform. Carbon is present in an amount between 5-25% by weight of the total composition, more preferably about 20% by weight of the total composition.

The resulting silicon-carbon structure has a number of interesting properties. For example, the bulk size of the composite is typically about 20 μm, though examination reveals that it is typically composed of a number of interconnected composites of about 10 nm in average size. The specific area of composites according to the invention may between 300-315 $m^2/g$, or lower than 315 $m^2/g$. Composites may also have a high tap density. For example, in some embodiments the tap density is greater than 0.75 $g/cm^3$. Capacity may be, for example, greater than 95% or greater than 96%.

In some embodiments the calcination of the silicon compound is conducted in the presence of a dopant precursor. This allows the incorporation of a dopant into the resulting silicon-carbon nanocomposite. In other embodiments alloy mixtures with the silicon are made. Suitable dopants include boron. Suitable alloys include germanium. The content of dopants ranges from 1% to 10% by atom and the content of alloy ranges from 10% to 90% by atom. They may be added as their oxides; for example, boron trioxide ("$B_2O_3$"), $P_2O_5$, or $GoO_x$, where x is 1 or 2 (germanium oxide and germanium dioxide).

Figure 2A:
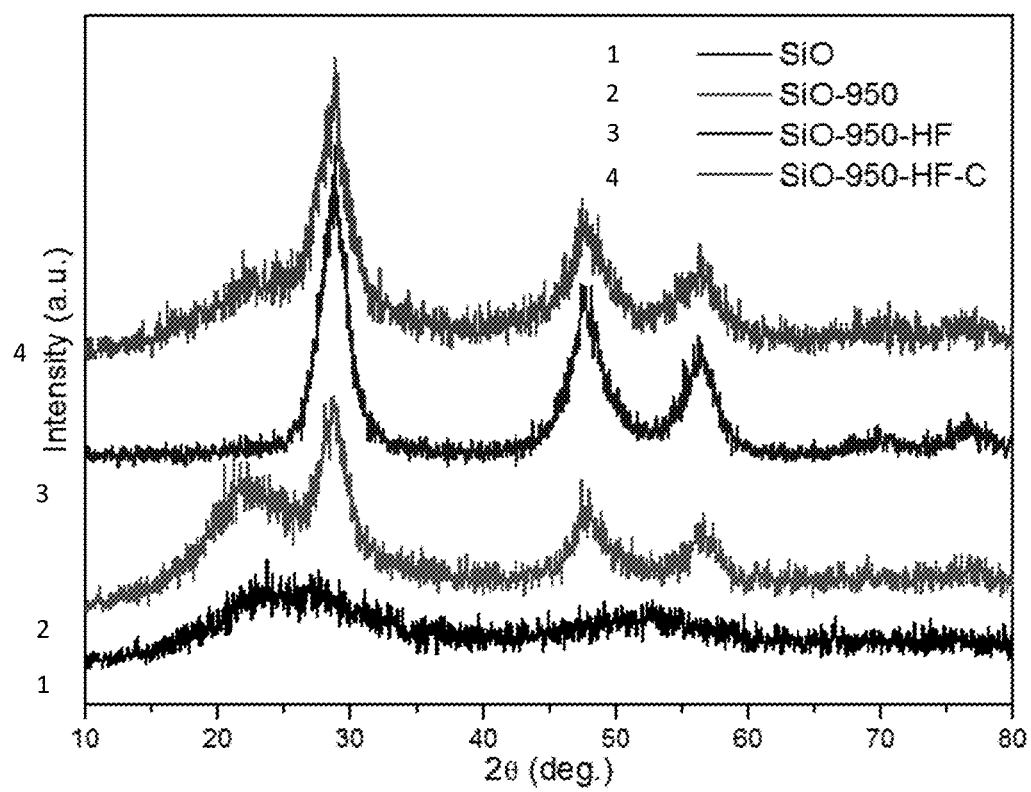
FIG. 2A shows XRD patterns of products obtained at different steps during preparation.
Figure 2B:
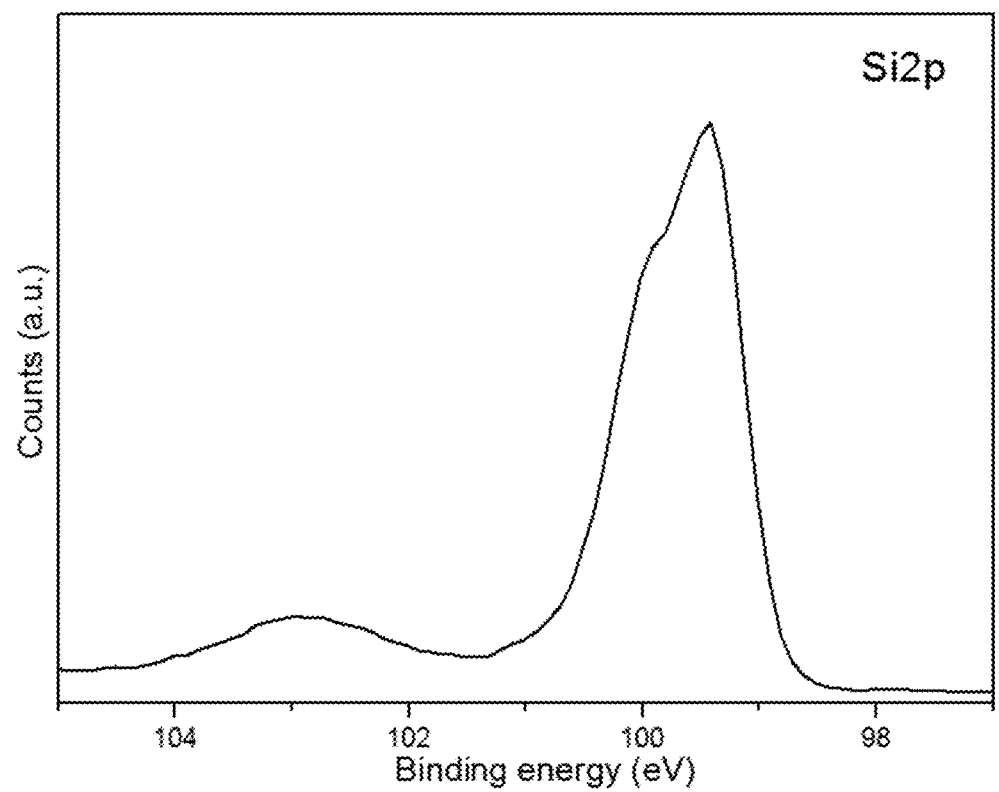
FIG. 2B is an XPS spectrum of porous silicon.
Figure 3A:
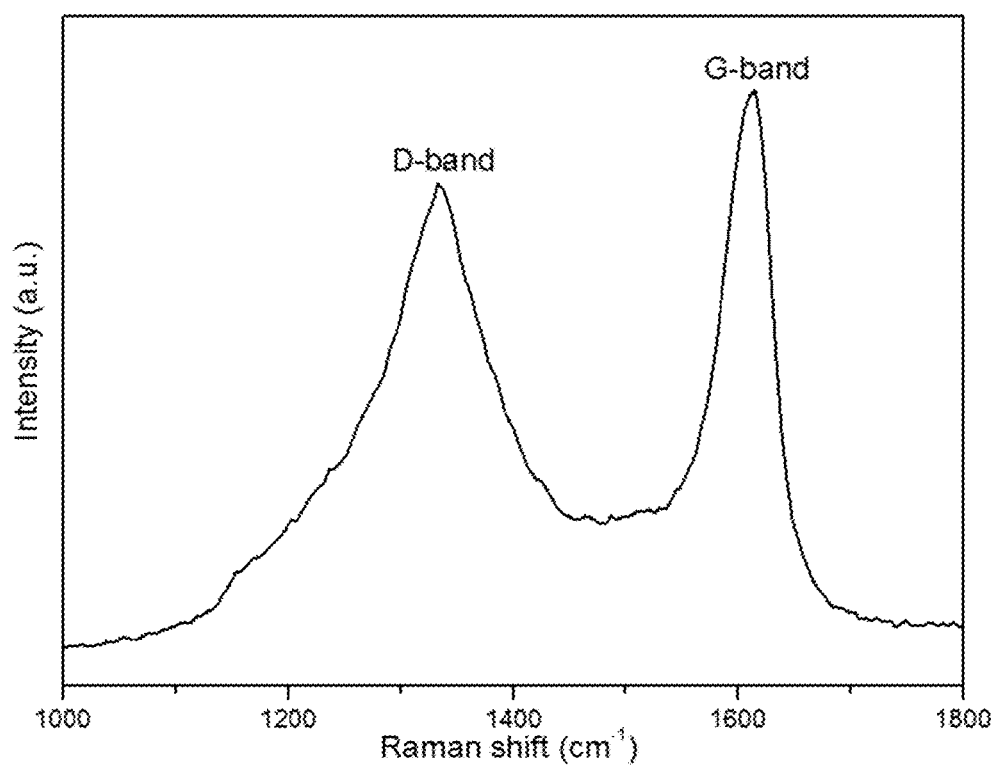
FIG. 3A is a Raman spectrum confirming the incorporation of carbon.

Embodiments of the invention may be better understood by the following discussion of typical preparations and processes associated with Si—C composites of the invention. The crystalline structures of the precursors and products obtained at different steps were characterized by X-ray diffraction (XRD). In one embodiment the SiO precursor shows two broad bumps (FIG. 2A), which indicates its amorphous nature. After being calcined at a range of temperature from 900 to 1150° C. for 2 to 24 h, SiO disproportionated to crystalline silicon and amorphous $SiO_2$, as shown in FIG. 2A. With the removal of $SiO_2$ by HF etching, crystalline silicon with face centered cubic (fcc) structure (JCPDS Card No. 27-1402) was obtained. The widened reflection peaks reveal the as-obtained silicon is composed of nanocrystallites. The average nanocrystallite size is estimated to be about 15 nm by using the Debye-Scherrer equation. XPS spectrum (FIG. 2B) also shows the presence of silicon. A strong peak at 99.4 eV is observed, corresponding to the binding energy of Si(0). Besides, a weak bump centered at around 103 eV, close to the binding energy of Si(+4), is found, which may be caused by the natural oxidation of silicon in air. After treatment by acetylene at 500 to 900° C. 620° C., a small bump between 20 to 25 degrees attributed to carbon is present (FIG. 2A). Raman spectrum (FIG. 3A) confirms the incorporation of carbon, in which two peaks at 1333 and 1614 $cm^{-1}$ were observed, corresponding to the D (disordered) band and the G (graphite) band, respectively. The ratio of the D band to the G band is estimated to be 1.3, indicating an amorphous carbon structure. The mass percentage of carbon is 20.8% based on the element analysis.

Figure 3B:
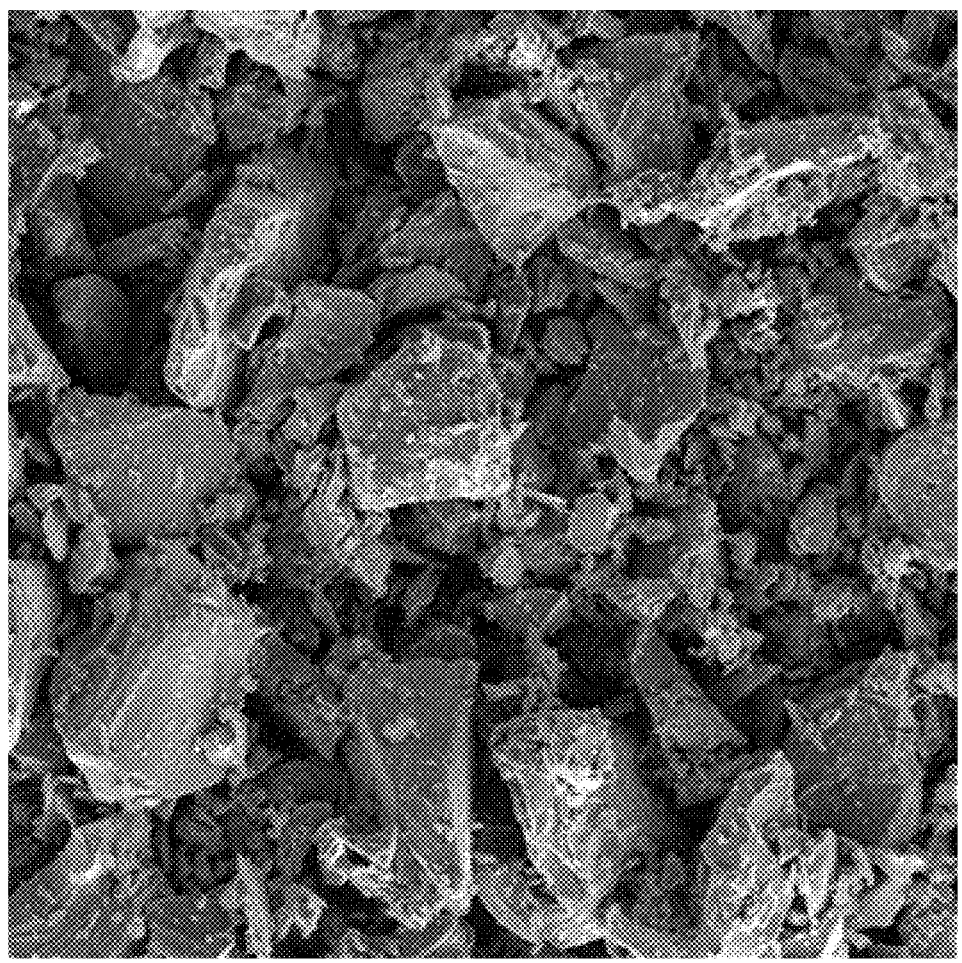
FIG. 3B is a SEM image of Si—C composite
Figure 3C:
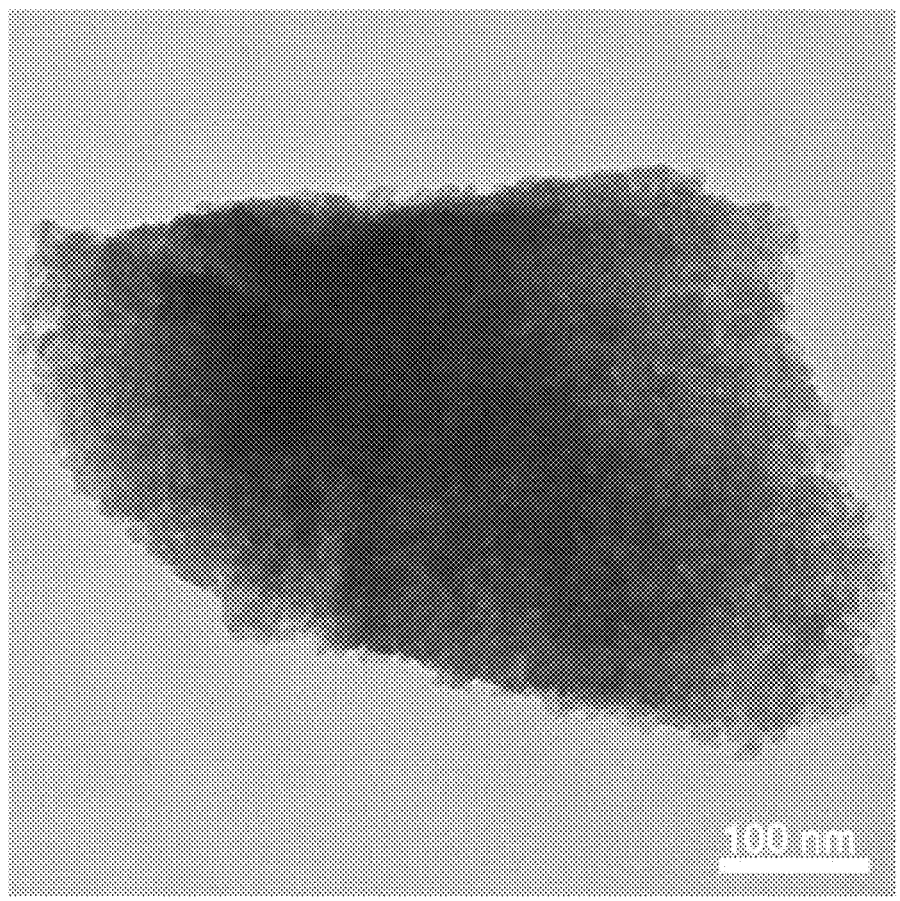
FIG. 3C is a TEM image of the Si—C composite.
Figure 4A:
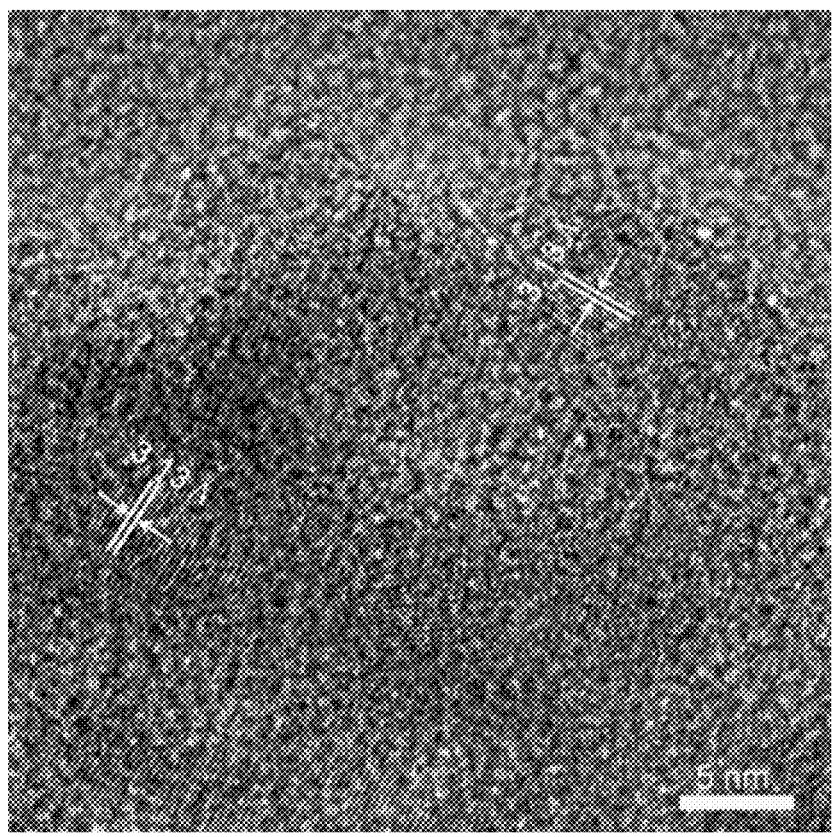
FIG. 4A shows a HRTEM image taken on the edge of an individual bulk particle.
Figure 4B:
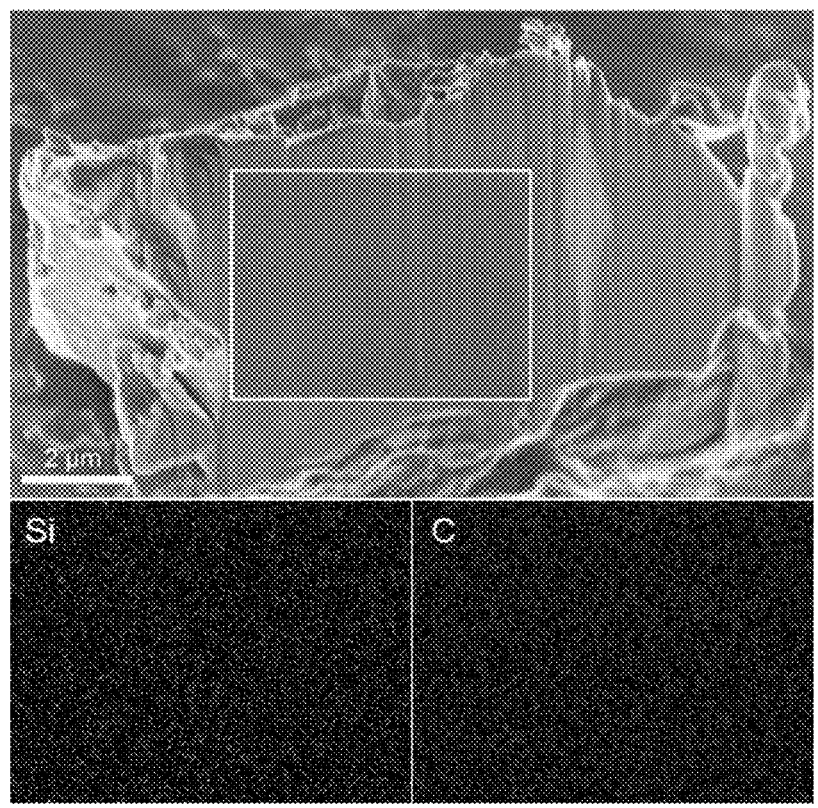
FIG. 4B shows a cross-section SEM and EDS mapping of silicon and C in the area marked by the white square of Si—C composites.

The morphology, size and structure of bulk Si—C composites have been investigated by SEM, TEM and HRTEM. A SEM image (FIG. 3B) shows the bulk Si—C composites are as large as 20 μm, similar to SiO precursors, suggesting the bulk feature was kept well during the calcination and etching process. The TEM observation reveals the structure of the bulk Si—C composites at nanoscale level. As shown in FIG. 3C, these bulk particles are actually composed of interconnected nanoparticles with size of about 10 nm. HRTEM analysis provides further insight into the structure of the bulk particles. FIG. 4A shows a HRTEM image taken on the edge of an individual bulk particle, in which many tiny nanocrystallites are observed and lattice spacings corresponding to (111) crystal planes of cubic silicon are distinguished. Between these nanocrystallites, amorphous structures are found, which are ascribed to carbon. To examine the distribution of C, EDS mapping on the cross section of a single Si—C composite was carried out. As shown in FIG. 4B, the distribution of C is uniform, indicating the homogenous carbon filling throughout the whole silicon framework. Combined the results above it can be concluded that silicon and C are three-dimensionally interwoven at nanoscale.

Figure 5A:
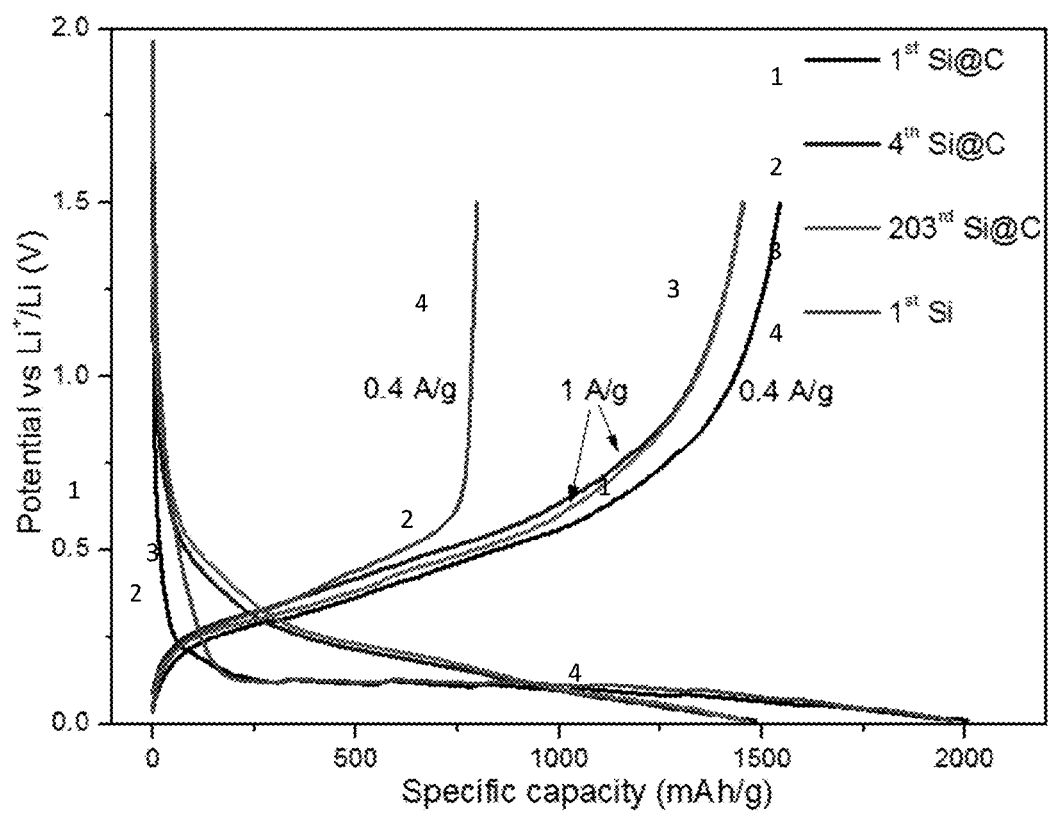
FIG. 5A shows the voltage profiles of porous silicon and Si—C composites.

Decreasing particle size and introducing carbon can enhance the cycling stability and rate capability of Si-based anode materials. The voltage profiles of bulk Si—C composites and silicon framework at different cycles are shown in FIG. 5A. The bulk Si—C composites deliver initial discharge and charge capacities of 2004 and 1544 mAh/g at 400 mA/g, respectively, corresponding to the first cycle coulombic efficiency (CE) of 77%. A low CE of only 40% (1970 and 798 mAh/g) was obtained for silicon framework. The much improved first cycle CE is attributed to the carbon filling, which largely reduces the direct contact between silicon and the electrolyte, and promotes the formation of a stable solid electrolyte interphase (SEI) layer on the surface of carbon. In addition, the lower specific area of the bulk Si—C composites (313 $m^2/g$ vs 87 $m^2/g$ of silicon framework) also contributes to the higher efficiency as less surface side reaction takes place.

Figure 5B:
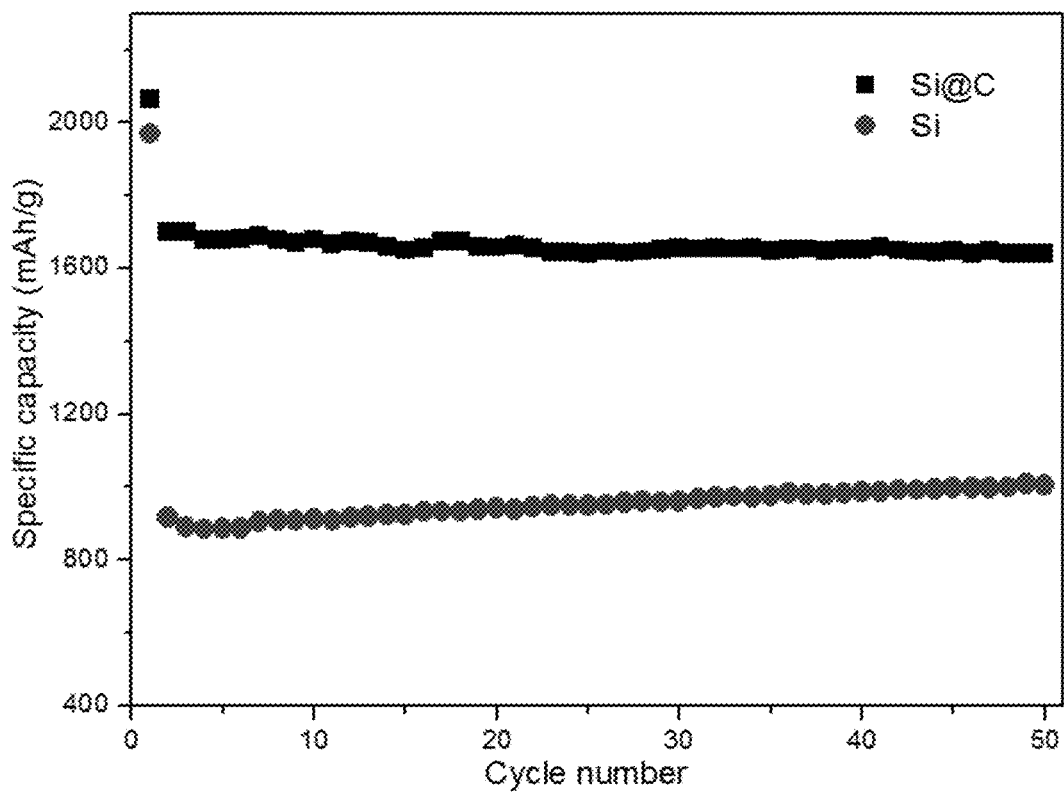
FIG. 5B shows cycling performance of porous silicon and Si—C composites at 400 mA/g.
Figure 6A:
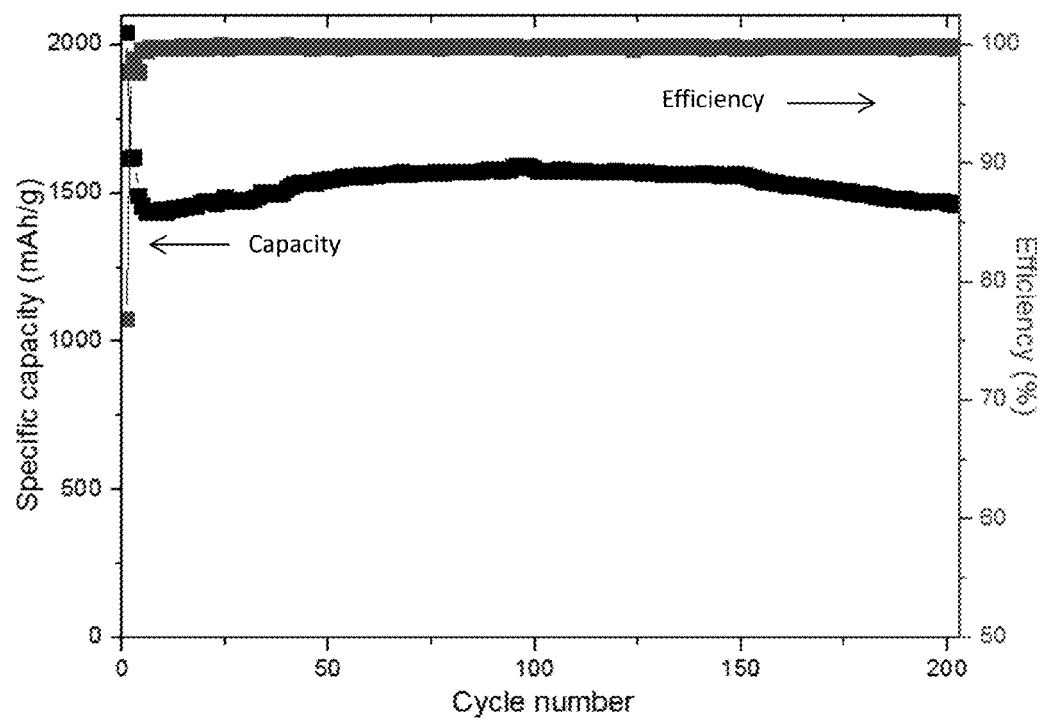
FIG. 6A shows the long cycling performance of Si—C composites at 1 A/g after the first three cycles activated at 400 mA/g.

The bulk Si—C composites also have a higher specific capacity than silicon framework, as shown in FIG. 5B. The capacity retention (based on the discharge capacity of the second cycle) of the bulk Si—C composites is 96.6% after 50 cycles at 400 mA/g. FIG. 6A shows the long-term cyclability at 1 A/g with the first three cycle activated at 400 mA/g. A capacity of 1459 mAh/g was attained after 200 cycles with a retention of 97.8% at 1 A/g. The CE increases above 99.5% in 5 cycles and thereafter remains at that level. The cycling stability can also be reflected by the almost overlapped voltage profiles of the $4^{th}$ and $203^{rd}$ cycles. The rate performance of the bulk Si—C composites has also been investigated.

Figure 6B:
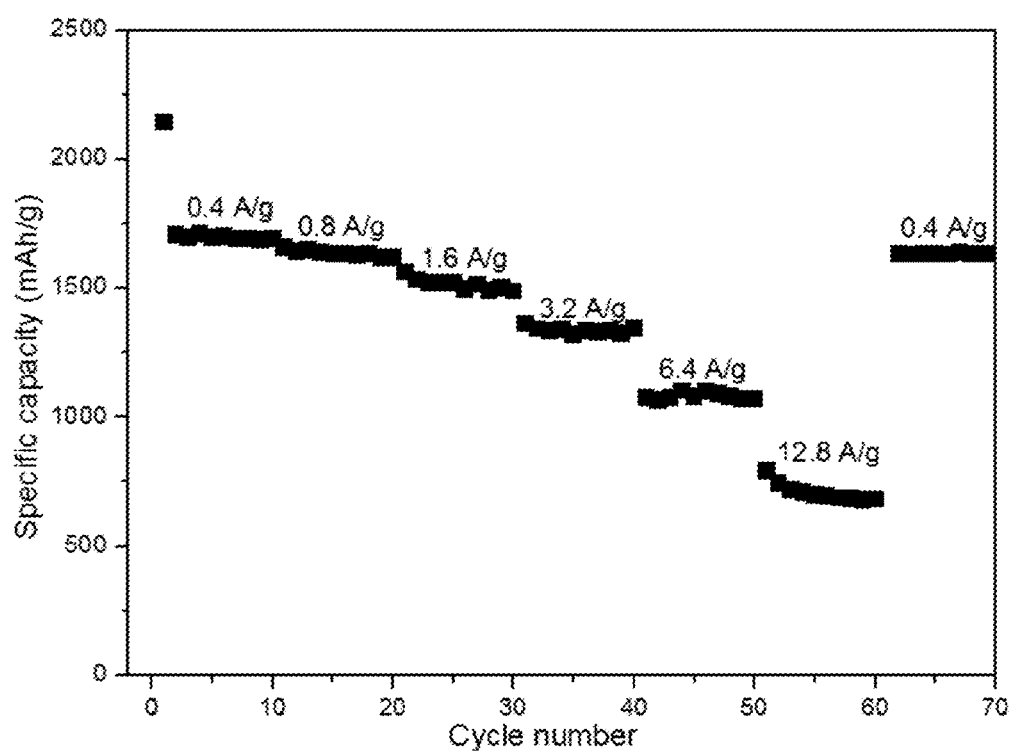
FIG. 6B shows the rate performance of Si—C composites.

As shown in FIG. 6B, even cycling at high current densities of 6.4 A/g and 12.8 A/g, capacities of 1100 and 700 mAh/g can be achieved, almost 3 times and 2 times the theoretical capacity of graphite, respectively. The capacity recovers to 1630 mAh/g when the current rate is restored to the initial 400 mA/g, showing a good reversibility.

Another feature of Si—C composites is the high tap density. Compared with other porous micro-sized Si—C composites, our bulk Si—C composites have a much higher tap density of 0.78 $g/cm^3$. This is ascribed to the carbon filling, which leads to a dramatic decrease of porosity. The silicon framework has a large porosity of 0.6 $cm^3/g$ (and a low tap density of 0.63 $g/cm^3$) while the porosity of bulk Si—C composites is only 0.06 $cm^3/g$, indicating the void space is almost completely filled with carbon. Based on the tap density and gravimetric capacity, the volumetric capacity of Si—C composite is estimated to be 1326 $mAh/cm^3$ at 400 mA/g.

Figure 7A:
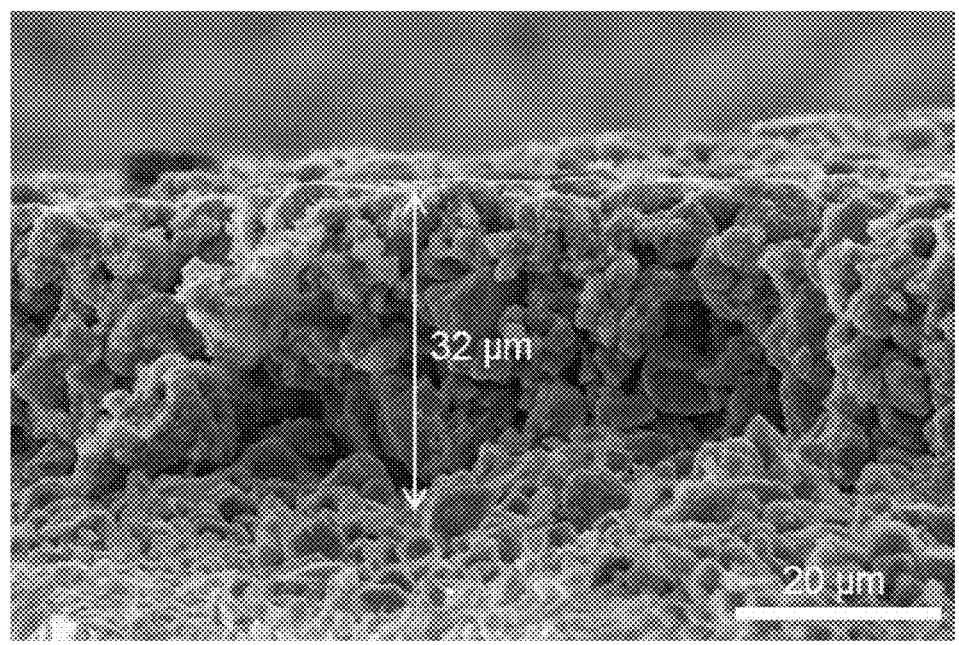
FIG. 7A shows cross-sectional SEM images of Si—C composites electrode before lithiation at 400 mA/g.
Figure 7B:
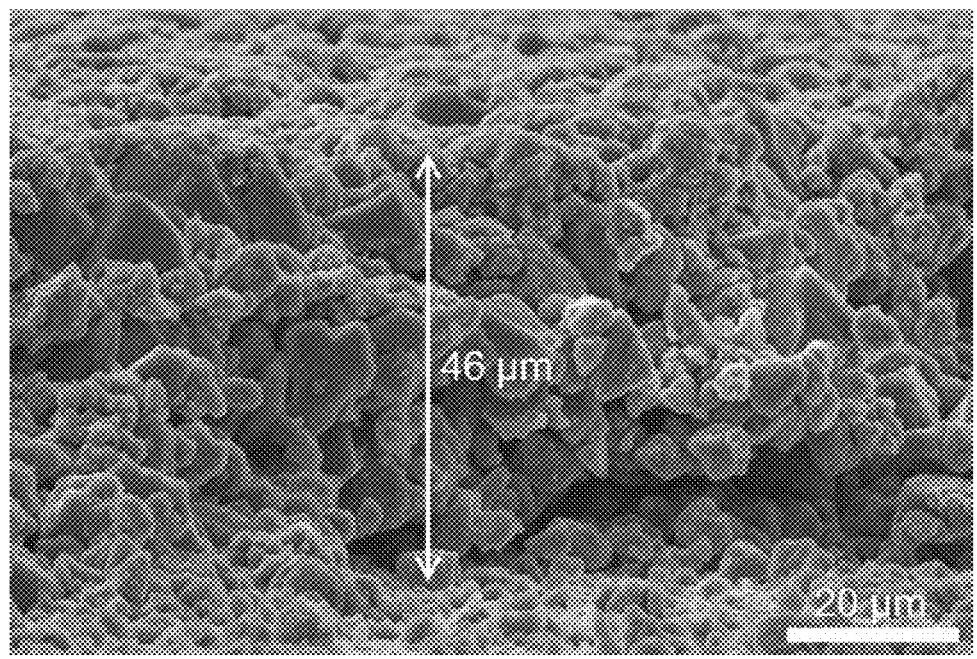
FIG. 7B shows cross-sectional SEM images of Si—C composites electrode after lithiation at 400 mA/g.
Figure 8:
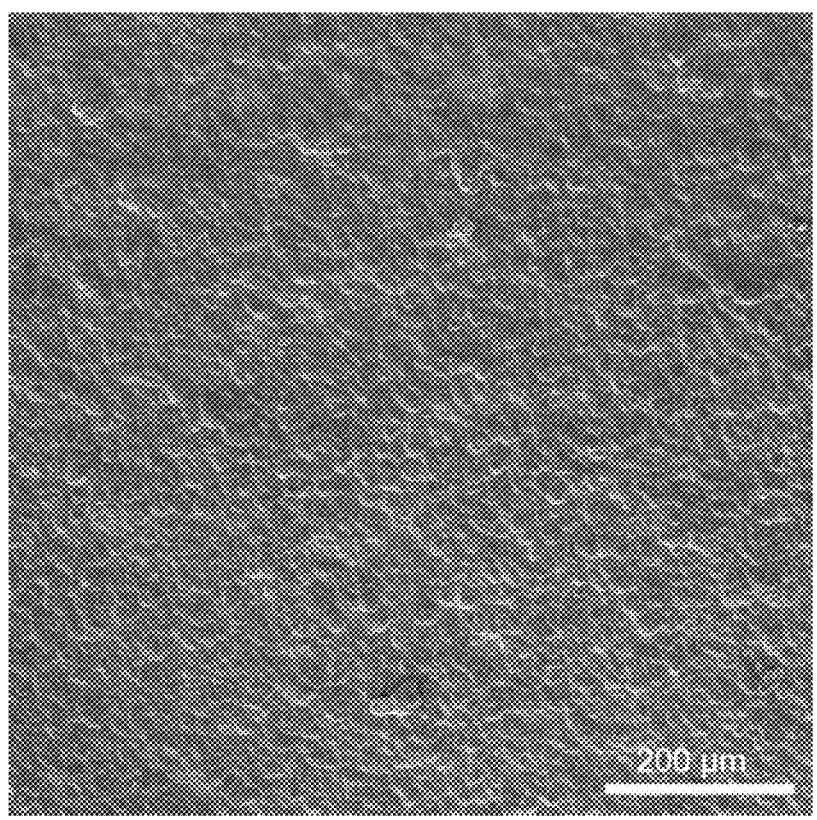
FIG. 8 shows SEM images of SEI layer after 10 cycles at 1 A/g.

Post-cycling SEM analyses show the morphology change of the Si—C composite electrode after charge/discharge to better understand the reason for such excellent cycling stability and rate performance of the micro-sized Si—C composite. Based on the thickness before (FIG. 7A) and after lithiation (FIG. 7B), the volume expansion of the Si—C composite electrode is calculated to be only 44%, similar to the reported result. In addition, a uniform and crack-free film was observed on the top of Si—C composite, indicating a stable SEI layer on the Si—C composite electrode (FIG. 8A). The SEM investigation on the electrode with the SEI layer removed also clearly demonstrates that the micro-sized Si—C composite particles fragment into smaller particles during cycling, as shown in FIG. 8B. However, the silicon building blocks are still interconnected with carbon in the small particles, maintaining effective electrical contact and good utilization of silicon.

Figure 9A:
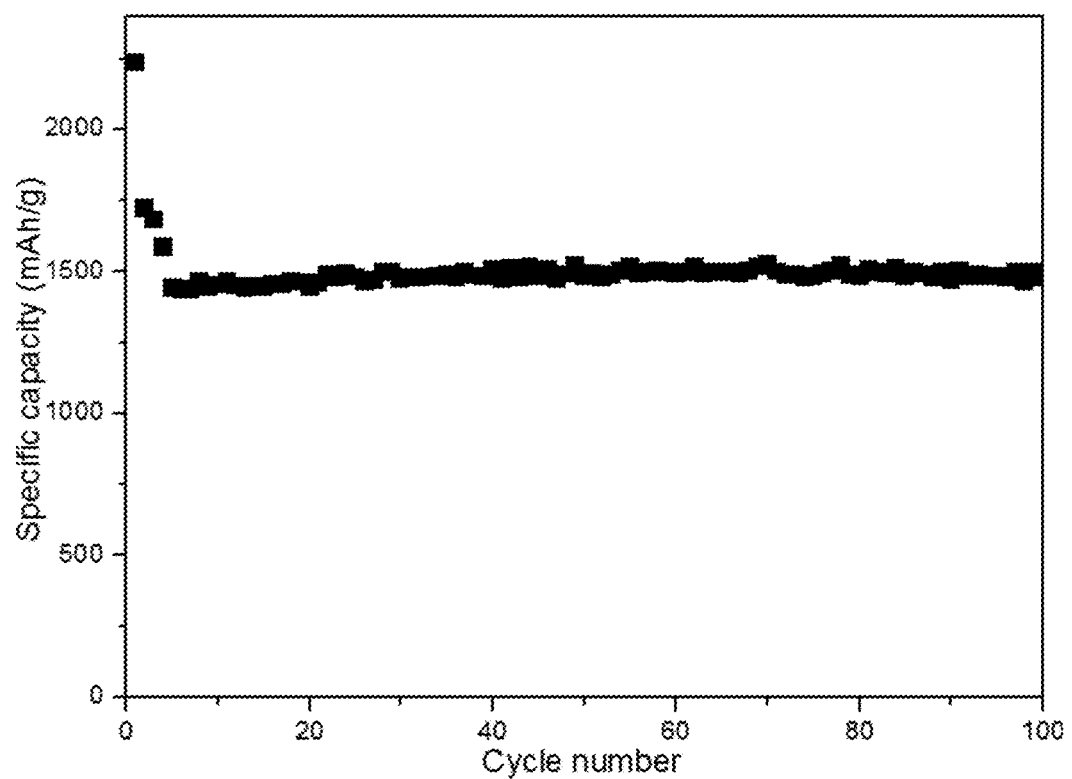
FIG. 9A shows Cycling performance of the Si—C composite without Super P® conductive carbon black. The testing conditions are identical to those used for electrodes with Super P® conductive carbon black, except that the ratio of the Si—C composite to PAA is 8:2.
Figure 9B:
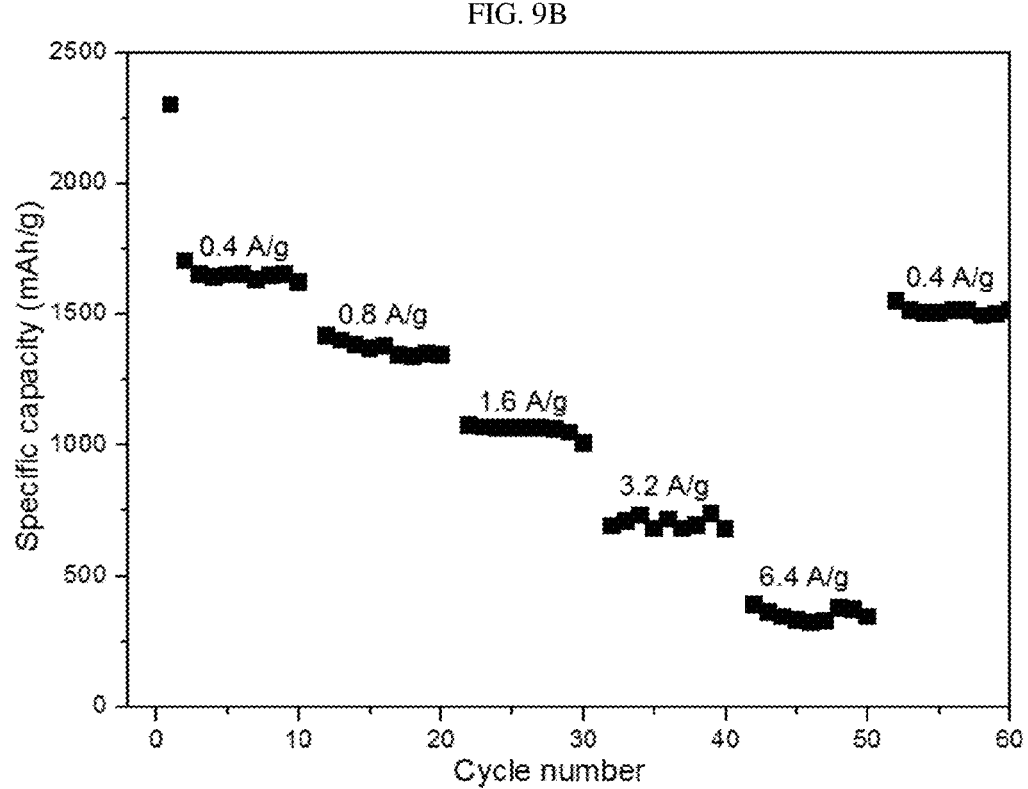
FIG. 9B shows rate performance of the Si—C composite without Super P® conductive carbon black. The testing conditions are identical to those used for electrodes with Super PO conductive carbon black, except that the ratio of the Si—C composite to PAA is 8:2.

To verify this point, a control electrode without using conductive carbon (i.e., Super P® conductive carbon black) was fabricated and evaluated, which would normally speed up capacity fading because of loss of electrical contact during cycling. The control electrode, however, exhibits similar good capacity retention to the electrode with Super P® conductive carbon black at 1 A/g (FIG. 9A). This result confirms that the micro-sized Si—C composite can maintain electrically-conducting pathways even after fracture and thus achieve excellent cycling stability. It should be noted that the conductive carbon additives are still needed to deliver high rate performance, where the electrical conductivity becomes the dominating limitation (FIG. 9B).

The excellent electrochemical performance of the micro-sized Si—C composite benefits from the nanoscale size of the silicon building blocks and the uniform carbon filling. On the one hand, stress in nanoparticles can be easily relaxed without mechanical fracture. The small size also enables short transport pathways for both electrons and Li+ ions, contributing to high rate capability.

On the other hand, the uniform carbon filling offers at least three advantages. First, the carbon provides an effective physical buffer layer for the volume change of silicon upon cycling, which preserves the structural integrity of the silicon building blocks. Second, the carbon filling forms an interpenetrating conductive network connecting the silicon building blocks and thus improves the conductivity of the composite. Without carbon in intimate contact with silicon building blocks, electrons have to transport across the whole micro-sized particles to reach the nearest conductive carbon. In our case, the carbon filling forms a conductive network connecting each silicon building block and thus confines the electron transfer path to the nanoscale, which permits rapid charge and discharge. Third, the uniform carbon filling also ensures the maximum utilization of silicon even when the micro-sized particles break into small pieces upon cycling.

Figure 10:
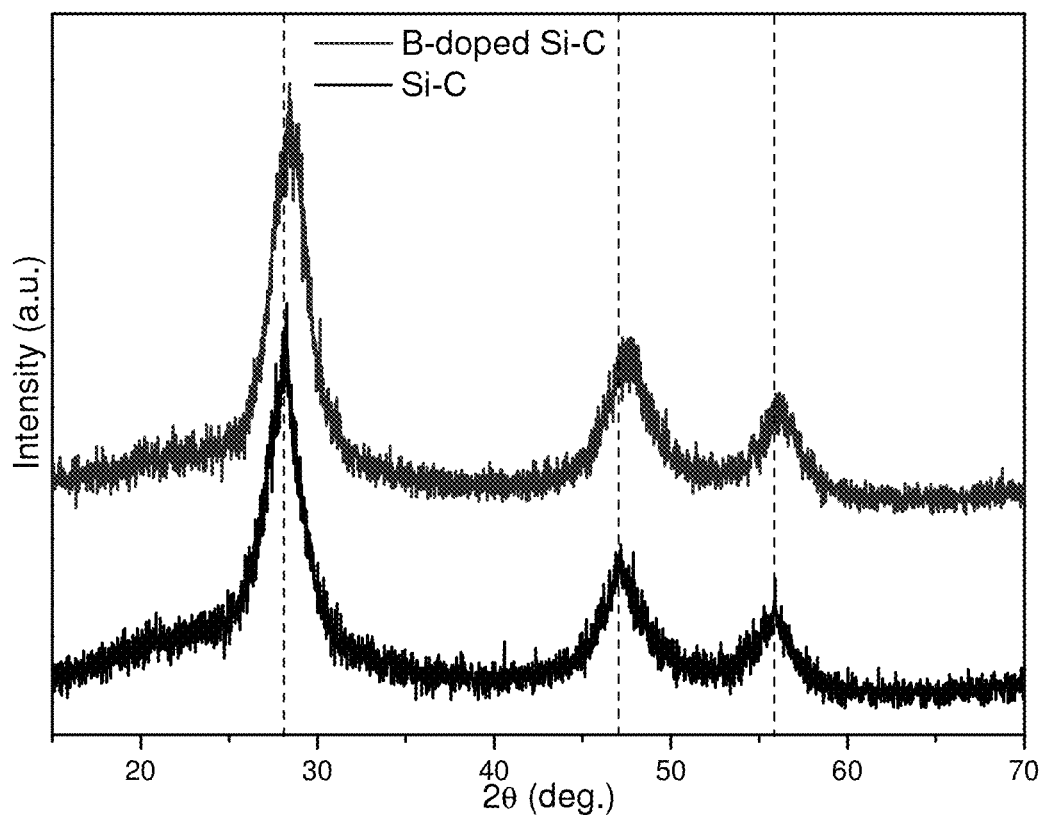
FIG. 10 XRD patterns of Si—C and B-doped Si—C.

The synthetic route can be extended to prepare doped Si-based composites by introducing dopant precursors during thermal disproportionation of SiO. These may include, for example, boron oxides and germanium oxides, which will add boron and germanium dopants, respectively. The phase and crystallinity of Si—C and B-doped Si—C were examined by XRD. Peaks of both XRD patterns can be indexed to those of face-centered cubic crystalline Si (JCPDS Card No. 27-1402), as shown in FIG. 10. Compared to undoped Si—C, the peaks of B-doped Si—C shift to higher angles due to the replacement of silicon atoms by smaller B atoms which leads to a smaller lattice constant. This result, combined with the absence of Si—B alloy peaks, indicates the successful doping of B into silicon.

Figure 11A:
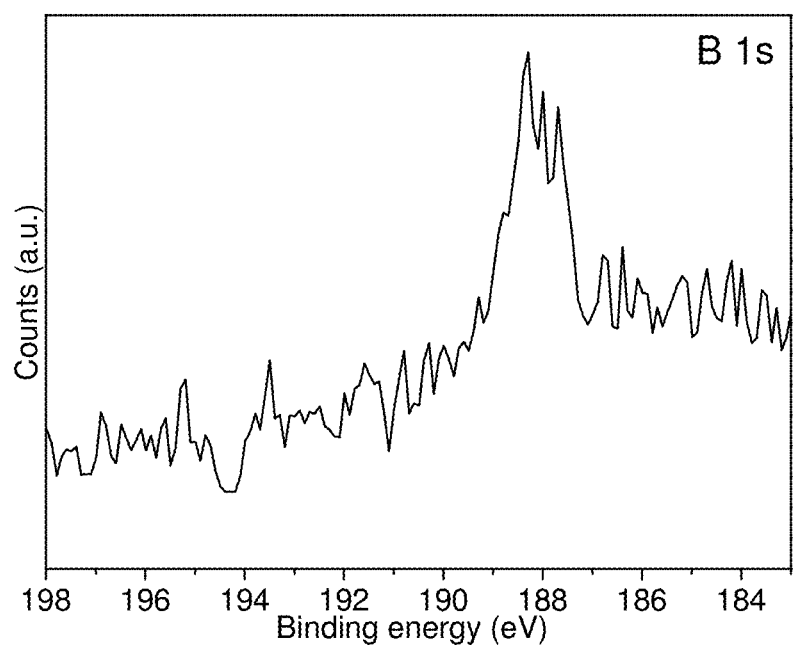
FIG. 11A Boron is XPS spectra of B-doped Si—C.
Figure 11B:
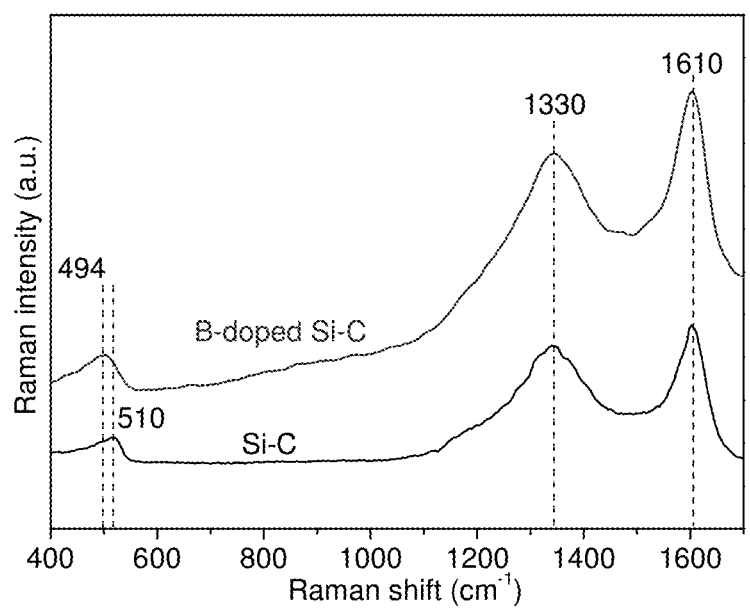
FIG. 11B Raman spectrum of B-doped silicon.

FIG. 11A shows the B 1s spectrum, which is rough due to the very low relative sensitivity of boron. The peak centered at 188 eV is attributed to B(0), serving as direct evidence of B doping. The content of B is calculated to be 4.1% (atomic percentage) by XPS survey, close to the designated composition of 5%. Raman spectroscopy was employed to further study the B-doped silicon after carbon coating. The silicon peak shifts from 510 cm$^{-1}$ for undoped silicon to 494 cm$^{-1}$ for B-doped silicon (FIG. 11B) due to disorder in the silicon structure caused by the stress developed in the surrounding silicon atomic network after B doping.

The doping effects on the electrochemical performance was evaluated by galvanostatic charge/discharge at different current densities. To examine the effects of B doping only, potential interference factors were excluded. First, electrodes were prepared without any external carbon additive. Second, to exclude the influence of carbon content, a similar carbon content of around 20 wt % (measured by elemental analysis) was achieved for both B-doped Si—C and Si—C.

Figure 12:
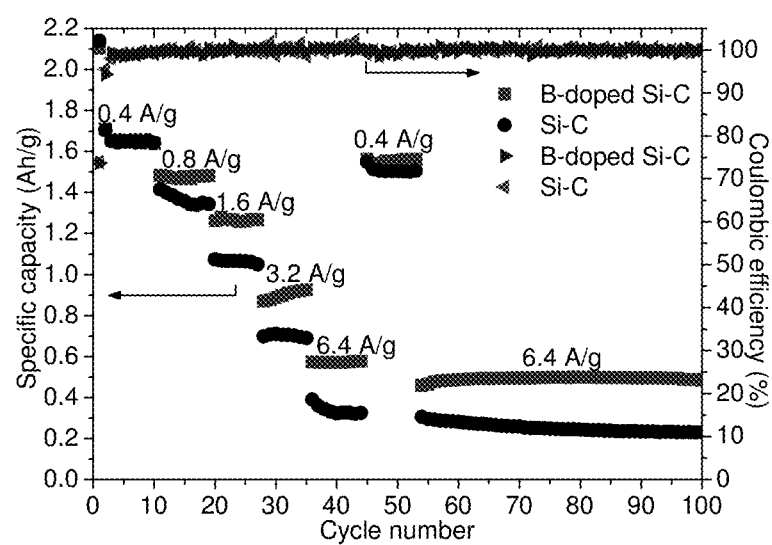
FIG. 12 Rate performance of B-doped Si—C and Si—C.

As shown in FIG. 12, B-doped Si—C exhibits similar specific capacity to Si—C at 400 mA/g due to the low content of B as discussed above. However, the difference in capacity can easily be observed at higher current densities. For example, Si—C can only achieve 323 mAh/g cycling at 6.4 A/g. In comparison, a capacity of 575 mAh/g (volumetric capacity of 449 mAh/cm3 based on tap density of 0.78 g/cm3) can be obtained for B-doped Si—C, about 80% higher than that of Si—C and 1.5 times the theoretical capacity of graphite. Note that this capacity was achieved without addition of any external conductive additive, which is usually present in large quantity (more than 20 wt %) in reports on Si-based materials with good high rate performance.

After the current density was restored to 400 mA/g, B-doped Si—C showed better stability than Si—C with similar capacity. The coulombic efficiency (CE) of B-doped Si—C remains above 99.5% at various rates. To further investigate the cycling stability at high rates, the current density was increased from 400 mA/g to 6.4 A/g again. In contrast to the obvious capacity fading of Si—C, the capacity of B-doped Si—C was stable for about 50 cycles at 6.4 A/g. The results indicate that boron doping improves the rate capability of the Si—C composite.

In summary, we have developed a *facile* route to bulk Si—C composites through converting commercial available SiO to silicon framework followed by carbon filling by acetylene deposition. The bulk Si—C composites exhibit a reversible capacity of 1459 mAh/g after 200 cycles at 1 A/g with a retention of 97.8% and have a tap density of 0.78 g/cm$^3$. Capacities of 1100 and 700 mAh/g can be obtained at high current densities of 6.4 A/g and 12.8 A/g, respectively. The excellent performance is attributed to the small size of primary particles and the carbon filling. The method is simple, low-cost and easy to scale up, and is thus believed to have great potential in practical production of high-performance silicon materials for Li-ion batteries.

Experimental

Synthesis of Si—C Composite

Commercially available SiO powder (for example, 325 mesh SiO powder from Aldrich) was used as precursors. The calcination of SiO powder was carried out in a horizontal quartz tube. In a typical process, high-purity Ar was introduced at a flow rate of 1500 sccm for 20 min to purge the system. Afterwards the flow rate was reduced to 100 sccm and the tube was heated to 950° C. with a ramping rate of 10° C./min and kept for 5 h. The samples were taken out of the tube at temperatures below 40° C. Then the samples were immersed in HF at room temperature for 3 h to remove SiO$_2$. The obtained porous silicon was collected by filtration and washed with distilled water and absolute ethanol in sequence several times. The final product was dried in a vacuum box at 60° C. for 4 h. Carbon coating of porous silicon was done by thermal decomposition of acetylene gas at 620° C. for 20 min in a quartz furnace.

Characterization

The obtained samples were characterized on a Rigaku Dmax-2000 X-ray powder diffractometer (XRD) with Cu Kα radiation (λ=1.5418 Å). The operation voltage and current were kept at 40 kV and 30 mA, respectively. The size and morphology of the as-synthesized products were determined by a JEOL-1200 transmission electron microscope (TEM), NOVA NanoSEM 630 scanning electron microscopy (SEM) and JEOL-2010F high-resolution transmission electron microscope (HRTEM). The Brunauer-Emmett-Teller (BET) specific surface area of the samples was determined by an ASAP 2020 using the standard N$_2$ adsorption and desorption isotherm measurements at 77 K.

Electrochemical Measurements

The electrochemical experiments were performed using 2016 coin cells, which were assembled in an argon-filled dry glovebox (MBraun, Inc.) with the silicon and carbon-coated bulk silicon electrode as the working electrode and the Li metal as the counter electrode. The working electrodes were prepared by casting the slurry consisting of 60 wt % of active material, 20 wt % of Super P® brand conductive carbon black, and 20 wt % of poly(acrylic acid) (PAA) binder. 1 mol L$^{-1}$ LiPF$_6$ in a mixture of ethylene carbonate, diethyl carbonate and dimethyl carbonate (EC:DEC:DMC, 2:1:2 by vol. %) and 10 wt % fluoroethylene carbonate (FEC) was used as the electrolyte (Novolyte Technologies, Independence, Ohio). The electrochemical performance was evaluated by galvanostatic charge/discharge cycling on an Arbin battery tester BT-2000 at room temperature under different current densities in the voltage range between 1.5 and 0.01 V versus Li$^+$/Li. The current density and specific capacity are calculated based on the mass of carbon-coated silicon composite.

Preparation of Si—C Composite

Example 1

5 g of commercially available SiO powder (325 mesh) from Aldrich was loaded in an alumina crucible and placed in the center of a horizontal quartz tube followed by Ar purge at a flow rate of 1500 sccm for 20 min. Then the flow rate was reduced to 100 sccm and the tube was heated to 950° C. with a ramping rate of 10° C./min and kept for 5 h. The samples were taken out of the tube at temperatures below 40° C. Then the samples were immersed in HF at room temperature for 3 h to remove $SiO_2$. The obtained powder was collected by filtration and washed with distilled water and absolute ethanol in sequence several times. The final product was dried in a vacuum box at 60° C. for 4 h, thereby preparing porous silicon.

Example 2

2 g of the porous silicon prepared as in Example 1 was loaded in an alumina crucible and placed in the center of a horizontal quartz tube followed by Ar purge at a flow rate of 1500 sccm for 20 min. Then a mixture of Ar/acetylene flow rate was introduced at a flow rate of 100 sccm and the tube was heated to 620° C. with a ramping rate of 10° C./min and kept for 20 min. The samples were taken out of the tube at temperatures below 40° C., thereby preparing the Si—C composite.

Heteroatomic Elemental Doping of the Porous Silicon

The preparation procedures of heteroatomic doped micro-sized Si—C composite (for example, boron-doped or germanium doped) are the same for Si—C composite, except a mixture of SiO powder and oxide powder (for example, $B_2O_3$), with molar ratio of Si:B as 10:1 was used as the starting material. In other embodiments the molar ratio of Si:B may range from 10:1 to 100:1. The products before and after carbon coating are designated B-doped silicon and B-doped Si—C, respectively. Undoped micro-sized Si—C composite is also produced for comparison and designated Si—C.

Preparation of Porous Silicon Alloy

The preparation procedures of heteroatomic doped micro-sized silicon alloy-C composite (for example, Si—Ge alloy, not limited to Si—Ge alloy) are the same for Si—C composite, except a mixture of SiO powder and oxide powder (for example, $GeO_x$), with controlled molar ratio of Si:Ge was used as the starting material. In embodiments, for example, the molar ratio of Si:Ge was between 1:9 and 9:1, preferably 9:1. The products before and after carbon coating are designated silicon alloy and silicon alloy-C, respectively.

Preparation of Anode:

Example 3

The Si—C composite prepared according to Example 2, carbon black (Super P) and poly(acrylic acid) (PAA) were mixed in a weight ratio of 6:2:2 to prepare a slurry. The slurry was coated on a Cu foil current collector using a doctor blade. The resultant Cu foil coated with the slurry was dried in vacuum at 80° C. for 2 h, thereby preparing an anode.

Example 4

An anode was prepared as in Example 3 except that the porous silicon prepared according to Example 1 was used instead of the Si—C composite prepared according to Example 2.

Example 5

An anode was prepared as in Example 3 except that ratio of the Si—C composite to PAA was 8:2 in the absence of carbon black (Super P®).

Preparation of Lithium-Ion Battery

Example 6

A CR2016-standard coin cell was assembled using the anode plate prepared according to Example 3, a counter electrode made of pure lithium metal, a polymer separator (Celgard 2300), and a electrolyte solution consisting of a mixture of ethylene carbonate, diethyl carbonate and dimethyl carbonate (EC:DEC:DMC, 2:1:2 by vol. %) and 10 wt % fluoroethylene carbonate (FEC) (Novolyte Technologies).

Example 7

A CR2016-standard coin cell was assembled as in Example 6 except that the anode plate prepared according to Example 4 was used instead of the anode plate prepared according to Example 3.

Example 8

A CR2016-standard coin cell was assembled as in Example 6 except that the anode plate prepared according to Example 5 was used instead of the anode plate prepared according to Example 3.

We claim:

1. A method for synthesis of interconnected Si—C Nano composites, comprising:
   mixing a dopant precursor with SiOx (0<x<2);
   calcining the mixture of the SiOx and the dopant precursor to form a doped nanostructure comprising nanocrystalline silicon, dopant and amorphous silicon dioxide;
   subjecting the doped nanostructure to hydrofluoric acid etching to form a porous doped silicon nanostructure;
   depositing carbon on the porous doped silicon nanostructure by thermal decomposition of gas, wherein said gas comprises organic molecules having carbon atoms, thereby forming an interconnected doped Si—C nanocomposite.

2. The method of claim 1, wherein said gas is one or members selected from the group consisting of methane, ethane, propane, butane, pentane, hexane, ethylene, propylene, butylene, and acetylene.

3. The method of claim 1, wherein said dopant precursor is selected from the group consisting of $B_2O_3$ and $P_2O_5$.

4. The method of claim 1, further comprising forming a silicon alloy component of the doped Si—C nanocomposite by including an alloy precursor in the mixture of SiOx and dopant precursor prior to the calcining step.

5. The method of claim 4, wherein said alloy precursor is germanium oxide.

6. The method of claim 1, wherein said SiOx (0<x<2) is selected from the group consisting of amorphous SiOx and crystalline SiOx.

7. The method of claim 1 wherein the calcining step is conducted in a horizontal quartz or alumina tube.

8. The method of claim 1, wherein the calcining step is preceded by a step comprising introducing high-purity Ar or N2 the same vessel as the SiOx at a flow rate of 1500 sccm for about 20 minutes.

9. The method of claim 8 further comprising reducing the flow rate to 100 sccm and heating the SiOx to a temperature from 900 to 1150° C. by increasing the temperature at a rate of about 10° C./min, then maintaining the maximum temperature for a duration between 2 to 24 hours.

10. The method of claim 1 wherein the hydrofluoric acid is about 48 wt % hydrofluoric acid.

11. The method of claim 1, wherein the etching is conducted by immersing the doped nanostructure comprising silicon, dopant, and silicon dioxide in the hydrofluoric acid for about 3 hours.

12. The method of claim 11 further comprising washing the porous silicon nanostructure with distilled water and absolute ethanol several times in sequence.

13. The method of claim 1 wherein the step of depositing carbon on the porous silicon nanostructure is performed at between about 500 to 900° C.

14. The method of claim 1 wherein NaOH is not included in the calcining step.

15. The method of claim 1 wherein acetic acid is not included in the etching step.

* * * * *